United States Patent
Shinkai

(10) Patent No.: US 11,055,032 B2
(45) Date of Patent: Jul. 6, 2021

(54) LEARNING DEVICE, PRINT CONTROL DEVICE, AND LEARNED MODEL

(71) Applicant: SEIKO EPSON CORPORATION, Tokyo (JP)

(72) Inventor: Masanari Shinkai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/714,897

(22) Filed: Dec. 16, 2019

(65) Prior Publication Data

US 2020/0192609 A1    Jun. 18, 2020

(30) Foreign Application Priority Data

Dec. 18, 2018   (JP) .............................. JP2018-236021

(51) Int. Cl.
*G06F 3/12*     (2006.01)
*G06N 3/08*    (2006.01)
*G06N 3/04*    (2006.01)

(52) U.S. Cl.
CPC .......... *G06F 3/1204* (2013.01); *G06F 3/1254* (2013.01); *G06N 3/04* (2013.01); *G06N 3/08* (2013.01)

(58) Field of Classification Search
None
See application file for complete search history.

(56) References Cited

U.S. PATENT DOCUMENTS

| 2007/0188787 | A1  | 8/2007  | Aiso |
|---|---|---|---|
| 2015/0363140 | A1* | 12/2015 | Koutrika ............ G06Q 30/0255 358/1.15 |
| 2016/0098606 | A1* | 4/2016  | Nakamura ......... G06K 9/00805 382/103 |
| 2019/0220694 | A1* | 7/2019  | Biswas ................. G06K 9/468 |
| 2020/0193249 | A1* | 6/2020  | Matsuzawa .............. G06N 3/04 |

FOREIGN PATENT DOCUMENTS

| JP | 2007-072823 A | 3/2007 |
|---|---|---|
| JP | 2010-173323 A | 8/2010 |
| JP | 2018-149738 A | 9/2018 |

* cited by examiner

*Primary Examiner* — Dung D Tran
(74) *Attorney, Agent, or Firm* — Global IP Counselors, LLP

(57) ABSTRACT

A learning device includes an acquiring unit and a learning unit. The acquiring unit acquires an image and instruction history information that indicates whether or not an instruction for printing was given to the image. The learning unit performs machine learning on conditions of a recommended image to be recommended for printing, based on a data set in which the image is associated with the instruction history information.

9 Claims, 8 Drawing Sheets

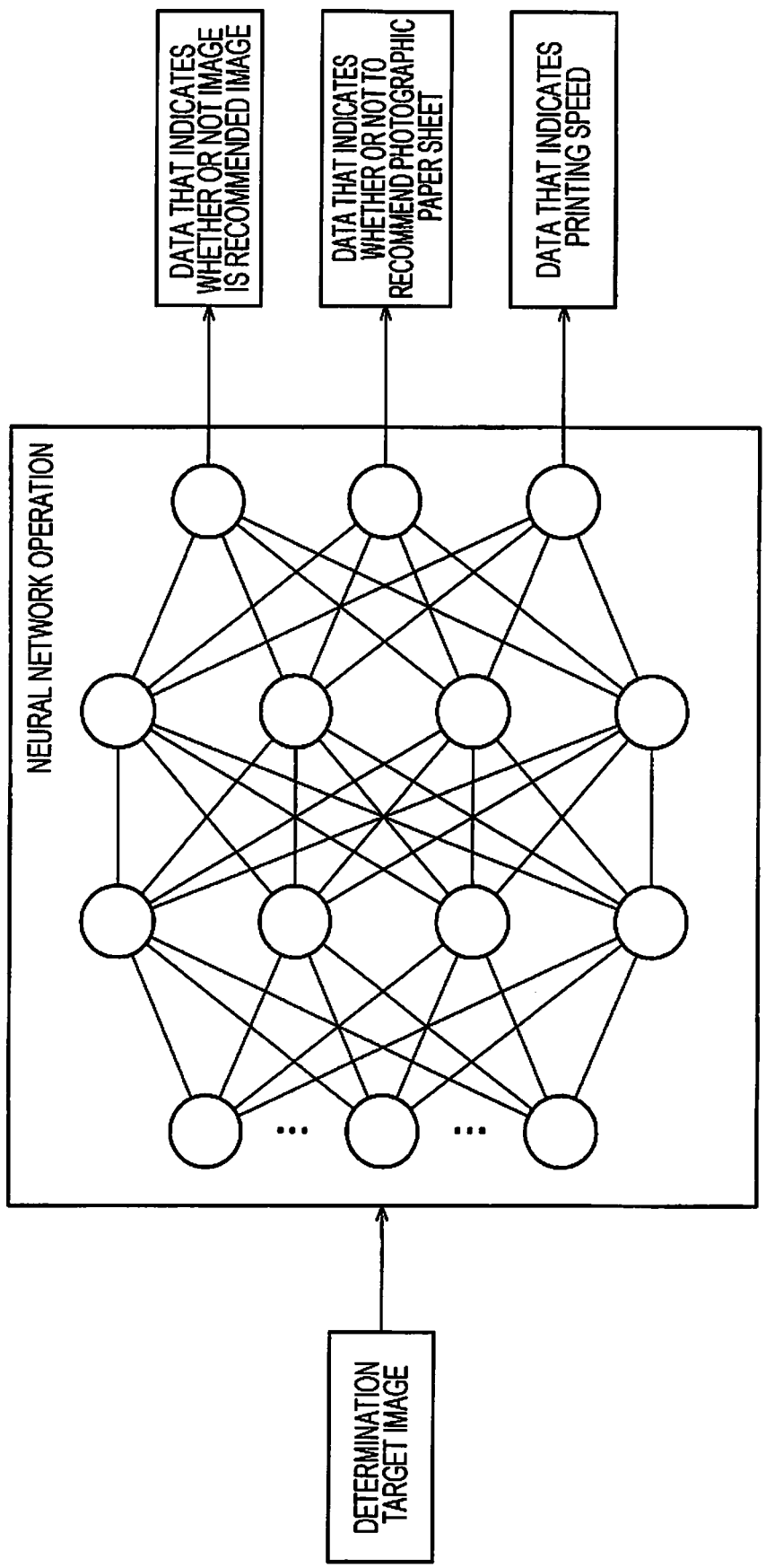

LEARNING DEVICE, PRINT CONTROL DEVICE, AND LEARNED MODEL

The present application is based on, and claims priority from JP Application Serial Number 2018-236021, filed Dec. 18, 2018, the disclosure of which is hereby incorporated by reference herein in its entirety.

BACKGROUND

1. Technical Field

The present disclosure relates to a learning device, a print control device, a learned model, and the like.

2. Related Art

In recent years, with the spread of digital cameras, the amount of image data that can be acquired by users has increased significantly. As the number of images increases, it is difficult to select an image to be printed. For example, when the user manually selects an image, it takes time.

JP-A-2010-173323 discloses a method for selecting an image to be recommended for printing from a plurality of images based on an evaluation value.

In the method of the related art, the man-hours required for parameter setting for recommending an appropriate image are enormous. For example, in the method of JP-A-2010-173323, the burden of setting an appropriate evaluation value is extremely large.

SUMMARY

An aspect of the present disclosure relates to a learning device including an acquiring unit that acquires an image and instruction history information that indicates whether or not an instruction for printing was given to the image; and a learning unit that performs machine learning on conditions of a recommended image to be recommended for printing, based on a data set in which the image is associated with the instruction history information.

BRIEF DESCRIPTION OF THE DRAWINGS

FIG. 11 illustrates a view for describing another example of input data and output data in the inference processing.

DESCRIPTION OF EXEMPLARY EMBODIMENTS

Figure 1:
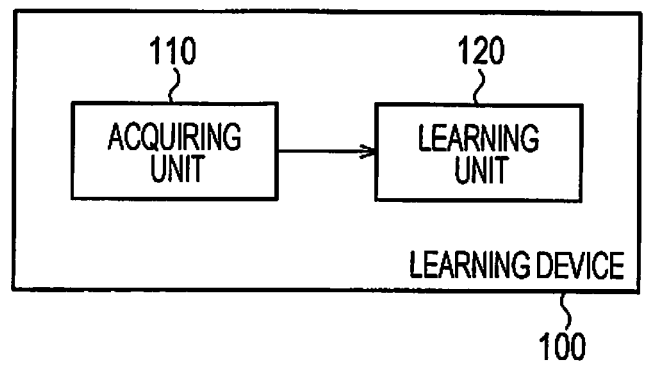
FIG. 1 illustrates a configuration example of a learning device.

Hereinafter, an embodiment will be described. In addition, the embodiment which will be described below does not inappropriately limit the contents described in the claims. Further, not all of the configurations which will be described in the embodiment are necessarily essential components of the disclosure.

1. Overview

In recent years, due to the spread of digital cameras and the like, a large number of images can be easily acquired. When printing an image in a printing apparatus, it is necessary to select a print target image from a large number of candidate images. The print target image is an image to be printed by the printing apparatus. The candidate image is an image that is a candidate for the print target image and is an image that a user can access. Since the number of candidate images is enormous, when the user manually selects the print target image, the burden on the user is large.

In contrast, a method for automatically selecting a desired image from a plurality of images is also disclosed. For example, a given feature amount is obtained based on the image, and comparison processing between the feature amount and a preset parameter is performed. When a feature common to an image that the user desires to print can be set as a parameter, an appropriate image can be automatically extracted based on the comparison processing, and the burden on the user can be reduced.

However, it is not easy to set the above-described parameters appropriately. For example, the images include different types of images, such as person images and landscape images. The landscape images can also be broadly classified into natural objects and artifacts, and further, among natural objects, mountains, mountain streams, sunset scenes, and the like can be subdivided. When manually setting parameters for selecting an image to be recommended for printing from such various images, the man-hours for the setting becomes enormous. In addition, in order to reflect the preference of the user, it is necessary to adjust the above-described parameters for each user. Therefore, the man-hours for parameter setting increases.

Accordingly, in the embodiment, machine learning is performed on conditions of a recommended image which is an image to be recommended for printing. In this manner, since the conditions of the recommended image is automatically learned, it is easy to construct a system that recommends printing of an appropriate image, for example, a system that receives a determination target image as an input and determines whether or not the determination target image is a recommended image. Further, by setting the data used for learning as data intrinsic to the user, it is also possible to acquire the learning result that reflects the preference for each user.

Hereinafter, learning processing and inference processing according to the embodiment will be described respectively. The learning processing is processing for acquiring the learning result by performing the machine learning based on training data. The learning result is specifically a learned model. The inference processing is processing for outputting some inference result based on the input by using the learned model generated by the learning processing. In addition, a method for updating the learned model based on the result of inference processing will also be described.

2. Learning Processing
2.1 Configuration Example of Learning Device

FIG. 1 is a view illustrating a configuration example of a learning device 100 according to the embodiment. The learning device 100 includes an acquiring unit 110 that acquires training data used for learning, and a learning unit 120 that performs the machine learning based on the training data.

The acquiring unit 110 is a communication interface that acquires the training data from another device, for example. Otherwise, the acquiring unit 110 may acquire the training data held by the learning device 100. For example, the learning device 100 includes a storage unit (not illustrated), and the acquiring unit 110 is an interface for reading the training data from the storage unit. The learning in the embodiment is supervised learning, for example. The training data in the supervised learning is a data set in which input data is associated with correct answer labels. The correct answer label may be referred to as teacher data.

The learning unit 120 performs the machine learning based on the training data acquired by the acquiring unit 110 and generates the learned model. In addition, the learning unit 120 according to the embodiment includes the following hardware. The hardware can include at least one of a circuit that processes a digital signal and a circuit that processes an analog signal. For example, the hardware can be configured by one or a plurality of circuit devices or one or a plurality of circuit elements mounted on a circuit board. The one or the plurality of circuit devices are, for example, IC. The one or a plurality of circuit elements are, for example, resistors, capacitors, and the like.

The learning unit 120 may be realized by the following processor. The learning device 100 according to the embodiment includes a memory that stores information, and a processor that operates based on the information stored in the memory. The information is, for example, a program and various data. The processor includes hardware. Various processors, such as a central processing unit (CPU), a graphics processing unit (GPU), and a digital signal processor (DSP) can be used as the processor. The memory may be a semiconductor memory, such as a static random access memory (SRAM) or a dynamic random access memory (DRAM); a register; a magnetic storage device, such as a hard disk device; or an optical storage device, such as an optical disk device. For example, the memory stores a command that is readable by a computer, the command is executed by the processor, and accordingly, the function of each unit of the learning device 100 is realized as processing. The command here may be a command of a command set that configures the program, or a command for instructing an operation to the hardware circuit of the processor.

More specifically, the acquiring unit 110 acquires an image and instruction history information that indicates whether or not an instruction for printing was given to the image. The instruction history information is information that indicates whether or not there is a history of instructing printing. In addition, the instruction history information may include information, such as the number of times of printing. The learning unit 120 performs machine learning on the conditions of a recommended image to be recommended for printing based on a data set in which the image is associated with the instruction history information. In this manner, a learning result in which a probability that an image having characteristics close to the image to which the print instruction was given is selected as the recommended image, is acquired. By using the learning result, an appropriate image can be selected as a recommended image. In particular, when the learning using the instruction history information for a given user is performed, an image having characteristics that the user tends to print is easily selected as a recommended image. In other words, the learning processing for making it possible to select a recommended image that reflects the preference of the user can be realized. As a result, even when there are many candidate images for the print target image, it is possible to reduce the burden on the user when selecting the print target image. A specific flow of the learning processing will be described later with reference to FIGS. 3 and 4.

Figure 2:
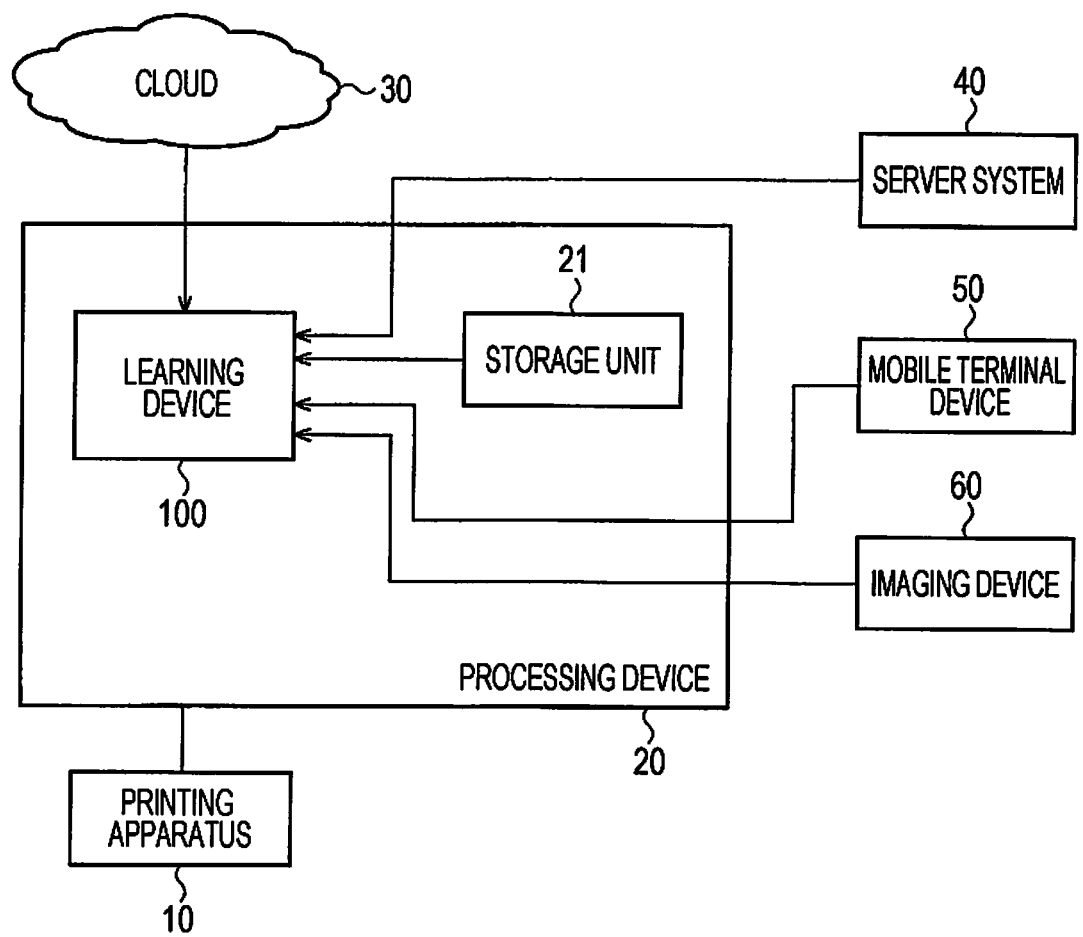
FIG. 2 illustrates a configuration example of a system including the learning device.

FIG. 2 is a view illustrating a configuration example of a system including the learning device 100 according to the embodiment. The learning device 100 is included in the processing device 20 connected to the printing apparatus 10, for example. Here, the printing apparatus 10 may be a multifunction peripheral (MFP) having a plurality of functions including a printing function.

The printing apparatus 10 can include a plurality of CPU, such as a main CPU and a sub CPU, or a micro-processing unit (MPU). The main CPU performs control of each part of the printing apparatus 10 and overall control. The sub CPU performs various processing for printing, for example. In addition, the printing apparatus 10 includes a print engine. The print engine is a mechanical configuration that executes image printing on a print medium. The print engine includes, for example, a transport mechanism, an ink jet type discharge head, a carriage driving mechanism including the discharge head, and the like. The print engine prints an image on a print medium by discharging an ink from the discharge head onto the print medium transported by the transport mechanism. As the print medium, various media, such as paper or cloth, can be used. In addition, the specific configuration of the print engine is not limited to the one exemplified here, and the print engine may be printed with a toner by an electronic processing system, or may be printed by a thermal transfer method. In addition, the printing apparatus 10 can include various configurations widely used in printing apparatuses, such as a communication unit, a storage unit, a display unit, and an operation unit.

The processing device 20 includes the learning device 100 and a storage unit 21. In addition, the processing device 20 includes a print application. The print application is software for causing a user to select the print target image and to execute a print instruction. Further, the print application performs processing for causing the printing apparatus 10 to print the print target image based on the print instruction of the user.

For example, the learning device 100 is a device that performs processing according to the print application in addition to the learning processing. More specifically, when the function of each unit of the learning device 100 is realized by the processor or the like operating according to learning software in which an algorithm related to the learning processing is described, the processor performs an operation according to the print application. In this manner, the learning device 100 can perform display processing of candidate images for the print target image, display processing of a print instruction button, user operation receiving processing, print execution processing, and the like. In addition, the print application may be software including a printer driver that is software for controlling the printing apparatus 10. Otherwise, the print application may be realized as software different from the printer driver. For example, a printer driver that is a print application communicates with the printing apparatus 10 by the printer driver itself or through another communication application or operating system.

Various modes are considered for a storage medium that stores the candidate images for the print target image. For example, the candidate image may be stored in the storage unit 21 of the processing device 20. The candidate image may be stored in the storage unit, such as an HDD included in the server system 40. The processing device 20 and the server system 40 are connected to each other via a network. The network here may be wired or wireless. For example, communication between the processing device 20 and the server system 40 is wireless communication according to a Wi-Fi system. The Wi-Fi system is a wireless communication system based on, for example, the IEEE 802.11 standard and standards conforming thereto.

The candidate images for the print target image may be stored in a storage unit, such as a mobile terminal device 50 or an imaging device 60. The mobile terminal device 50 is, for example, a smartphone or a tablet terminal. The imaging device 60 is a digital camera. The storage units of the mobile terminal device 50 and the imaging device 60 may be a built-in memory or a memory card mounted in a memory card slot. The processing device 20 and the mobile terminal device 50 may be connected using wireless communication in accordance with a standard, such as Wi-Fi or Bluetooth (registered trademark), or may use wired connection in accordance with a standard, such as universal serial bus (USB). The connection between the processing device 20 and the imaging device 60 is the same.

In addition, the candidate images for the print target image may be stored in a cloud 30. Specifically, the candidate image may be stored in the storage medium realized as a cloud service. In the cloud service, the processing device 20 can refer to the candidate image stored on the network without being aware of a specific device including the storage medium. The network used for the cloud service is a public wireless communication network, such as the Internet.

The print application of the processing device 20 receives the print instruction for the print target image. As described above, when the learning device 100 has a function of the print application, the image selected as the print target image and the instruction history information that indicates that the instruction for printing was given to the image are stored in the storage unit 21 in association with each other. Further, regarding the image that does not have a history of the print instruction being given, the learning device 100 may store the image and the instruction history information that indicates that the instruction for printing was not given to the image, in the storage unit 21 in association with each other.

However, the learning device 100 according to the embodiment is not limited to the configuration described above. For example, the learning device 100 having a function of the print application may be included in another device, such as the mobile terminal device 50. In a broad sense, the learning device 100 may be included in a device that is not directly connected to the printing apparatus 10. In this case, the learning device 100 transmits the print instruction to the printing apparatus 10 via the printer driver included in the processing device 20. For example, the learning device 100 may be included in the server system 40 of FIG. 2 or may be included in another server system. The learning device 100 in this case is a Web application, for example. Otherwise, the learning device 100 may be included in another apparatus illustrated in FIG. 2, or may be included in an apparatus not illustrated in FIG. 2.

Further, the learning device 100 according to the embodiment is not limited to the device having a function of the print application. Specifically, the print application may be a program that operates on a processor different from the processor that realizes the functions of the each unit of the learning device 100. In this case, the management of the information that specifies the image selected as the print target image and the instruction history information related to the image is executed in the print application provided outside the learning device 100. The acquiring unit 110 of the learning device 100 performs processing for acquiring the training data including the image and the instruction history information from the print application.

2.2 Example of Data Set Used for Learning Processing

As described above, the training data used in the learning processing according to the embodiment is a data set in which at least the image is associated with the instruction history information on the image. By performing the learning processing using such a data set, it becomes possible to select an image preferred by the user as the recommended image. In addition, it is not hindered to add information other than the image and the instruction history information to the training data in order to further reflect the preference of the user.

For example, the acquiring unit 110 acquires print setting information that indicates a print setting used when executing the printing of the image, in addition to the image and the instruction history information. Here, the print setting includes setting items, such as a print medium used for printing and a printing speed. The print setting information is data in which setting items, such as a print medium, are associated with setting values. For example, the acquiring unit 110 acquires the print setting information from the above-described printer driver. The learning unit 120 performs the machine learning on the condition of the recommended image based on the data set in which the image is associated with the instruction history information and the print setting information.

For example, the learning unit 120 learns the conditions of the recommended image based on the data set using the image and the print setting information as inputs and using the instruction history information as a correct answer label for the input. In this case, the learned model that is the learning result receives the image and the print setting information that indicates the print setting at this time as inputs, and performs processing for estimating whether or not to recommend to print the image in the print setting.

In this manner, it becomes possible to select a recommended image that takes into account not only the characteristics of the image itself but also the print setting. When printing a photo, high-definition printing is possible by using a photographic paper sheet as a print medium and performing the printing at a lower speed compared to a document or the like. However, the photographic paper sheet is more expensive than a normal paper sheet. Further, when the printing speed is low, the time required for printing becomes long. In other words, when cost and time are taken into consideration, the optimum print setting varies depending on the preference of the user. According to the method of the embodiment, learning that reflects the preference of the user regarding the print setting is possible.

In addition, the acquiring unit 110 acquires print time information that indicates print time of the image in addition to the image and the instruction history information. The printing time information is information that indicates time, date, day of the week, or a combination of two or more thereof. Further, the date may be month and day, may be year, month, and day, or may be only day. For example, the acquiring unit 110 acquires the printing time from a time measuring unit included in the learning device 100. The time measuring unit here is a real-time clock, for example. Further, the time measuring unit may be provided outside the learning device 100. The learning unit 120 performs the machine learning on the conditions of the recommended image based on the data set in which the image is associated with the instruction history information and the print time information.

For example, the learning unit 120 learns the conditions of the recommended image based on the data set using the image and the print time information as inputs and using the instruction history information as a correct answer label for the input. In this case, the learned model that is the learning result receives the image and the date or time at this time as inputs, and performs processing for estimating whether or not to recommend for printing the image in the date or time.

In this manner, it becomes possible to select a recommended image that takes into account not only the characteristics of the image itself but also the time when the printing is performed. For example, depending on the life rhythm of the user, there is a case where a time zone with a high probability of executing the printing and a time zone with a low probability. Although notification of a recommended image in a time zone with a high print execution frequency is useful, even when the recommended image is notified in a time zone with a low print execution frequency, there is a concern that the user feels annoying. According to the method of the embodiment, learning that reflects the preference of the user regarding the print time is possible. In addition, a user who has a preference that a specific type of image is printed quickly, but other types of images are printed together on weekends, is considered. By learning the image in association with the printing time information, it is possible to acquire a learning result that makes it possible to select the recommended image considering both the image and the time.

In addition, the acquiring unit 110 acquires print output destination information that indicates a print output destination of the image in addition to the image and the instruction history information. The print output destination information is information for specifying the printing apparatus 10 used for printing. The information that specifies the printing apparatus 10 may be a serial number of the printing apparatus 10, a MAC address of a network interface of the printing apparatus 10, or other identification information. The learning unit 120 performs the machine learning on the conditions of the recommended image based on the data set in which the image is associated with the instruction history information and the print output destination information.

For example, the learning unit 120 learns the conditions of the recommended image based on the data set using the image and the print output destination information as inputs and using the instruction history information as a correct answer label for the input. In this case, the learned model that is the learning result receives the image and the print output destination information that indicates the currently set print output destination, and performs processing for estimating whether or not to recommend for printing the image in the print output destination.

In this manner, it becomes possible to select a recommended image that takes into account not only the characteristics of the image itself but also the printing apparatus 10 which has performed the printing. For example, in an office or the like, there is a case where a plurality of printing apparatuses 10 that can be used by the user exist. Depending on the printing apparatus 10, the type of ink, whether or not aggregate printing is possible, whether or not special printing is possible, the presence or absence of a finisher, and the like are different. The aggregate printing is a printing method in which a plurality of pages of data are combined into one page. The special printing includes watermark printing, barcode printing, and the like. The finisher is hardware that collects a plurality of print results with a stapler, for example. In addition, depending on the printing apparatus 10, the movement time and movement distance when the user moves to the printing apparatus 10 are different. The desirable printing apparatus 10 for printing varies depending on the preference of the user and the type of document to be printed. According to the method of the embodiment, by learning the image in association with the printing apparatus 10 of the print output destination, it is possible to acquire the learning result that makes it possible to select the recommended image considering both the image and the printing apparatus 10.

In addition to the image and the instruction history information, the acquiring unit 110 acquires storage place information that indicates a storage place of the image. The storage place information is information that specifies a device that stores the candidate image for the print target image, such as the storage unit 21, the cloud 30, the server system 40, the mobile terminal device 50, and the imaging device 60 of the processing device 20 in FIG. 2. Further, the storage place information may be more specific information, for example, information that can identify whether the device is a built-in memory, such as a RAM, or an external memory, such as an SD card. The learning unit 120 performs the machine learning on the conditions of the recommended image based on the data set in which the image is associated with the instruction history information and the storage place information.

For example, the learning unit 120 learns the conditions of the recommended image based on the data set using the image and the storage place information as inputs and using the instruction history information as a correct answer label for the input. In this case, the learned model which is the learning result receives the image and the storage place information that indicates the storage place of the image, and performs processing for estimating whether or not to recommend to print the image stored in the storage place.

In this manner, it becomes possible to select the recommended image that takes into account not only the characteristics of the image itself but also the place where the image is stored. For example, data uploaded to the cloud 30 is irreversibly compressed in many cases. Users who prefer high-definition printing are considered to be less frequent to print images stored in the cloud 30. Meanwhile, there is a possibility that users who do not place importance on image quality also frequently consider the image stored in the cloud 30 as a print target. In other words, the desirable storage place of the image to be printed differs depending on the preference of the user. According to the method of the embodiment, by learning the image in association with the storage place, it is possible to acquire the learning result that makes it possible to select the recommended image considering both the image and the storage place. In addition, although the cloud 30 has been described here, the same applies to other devices. Specifically, depending on the storage place, the storage mode of the image, whether or not the storage place is connected to the printing apparatus 10 directly or through another apparatus, the communication standard of the connection, and the like are different, and thus, an appropriate storage place differs depending on the situation. Therefore, the case where the learning processing including the storage place is useful is not limited to the case where the cloud 30 is used.

In addition, the information added to the data set is not limited to any one of the print setting information, the print time information, the print output destination information, and the storage place information, and two or more pieces of information may be added. For example, since the items and setting values that can be set differ depending on the printing apparatus 10, it is useful to learn by associating the print settings with the print output destination. In addition, since the data uploaded to the cloud 30 is irreversibly compressed in many cases, deterioration in image quality tends to be noticeable when the print setting is for large format printing. In other words, it is also useful to perform the learning by associating the print settings with the storage places. In addition, by adding a plurality of pieces of information to the data set, the learning processing can be performed in consideration of the relationship between pieces of information.

2.3 Specific Example of Learning

The learning processing based on the data set will be described in detail. Here, the machine learning using the neural network will be described.

Figure 3:
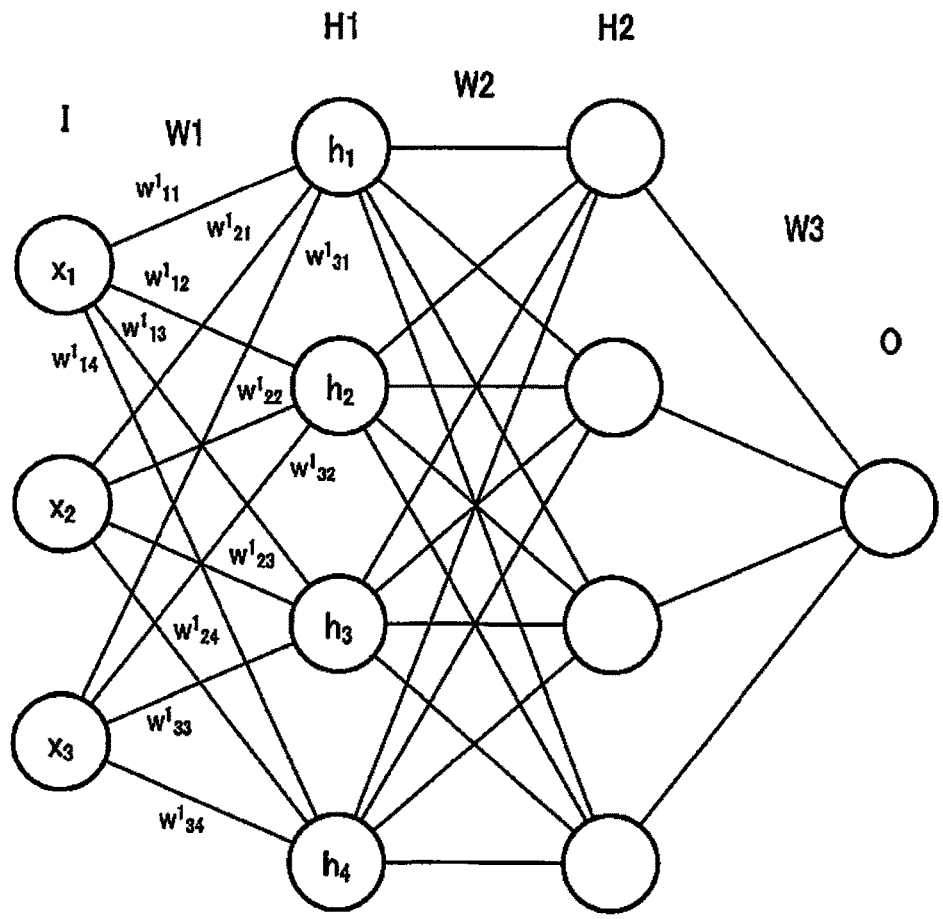
FIG. 3 illustrates a configuration example of a neural network.

FIG. 3 is a basic structure example of the neural network. The neural network is a mathematical model that simulates brain functions on a computer. One circle in FIG. 3 is called a node or a neuron. In the example of FIG. 3, the neural network has an input layer, two intermediate layers, and an output layer. The input layer is I, the intermediate layers are H1 and H2, and the output layer is O. In the example of FIG. 3, the number of neurons in the input layer is 3, the number of neurons in the intermediate layer is respectively 4, and the number of neurons in the output layer is 1. However, various modification examples of the number of intermediate layers and the number of neurons included in each layer are possible. The neurons included in the input layer are each coupled to the neurons of H1 that is the first intermediate layer. Each neuron included in the first intermediate layer is coupled to the neurons of H2 which is the second intermediate layer, and each neuron included in the second intermediate layer is coupled to the neurons of the output layer. In addition, the intermediate layer may be referred to as a hidden layer.

Each input layer is a neuron that outputs an input value. In the example of FIG. 3, the neural network receives x1, x2, and x3 as inputs, and each neuron in the input layer outputs x1, x2, and x3, respectively. In addition, some preprocessing may be performed on the input value, and each neuron in the input layer may output the preprocessed value.

In each neuron after the intermediate layer, an arithmetic operation that simulates how information is transmitted as an electrical signal in the brain is performed. In the brain, the ease with which information is transmitted changes corresponding to the connection strength of synapses, and thus, the neural network expresses the connection strength with a weight W.

W1 in FIG. 3 is a weight between the input layer and the first intermediate layer. W1 represents a set of weights between a given neuron included in the input layer and a given neuron included in the first intermediate layer. When the weight between the p-th neuron number in the input layer and the q-th neuron in the first intermediate layer is expressed as $w^1_{pq}$, W1 in FIG. 3 is information including 12 weights $w^1_{11}$ to $w^1_{34}$. More broadly, the weight W1 is information consisting of the number of weights equal to the product of the number of neurons in the input layer and the number of neurons in the first intermediate layer.

In the first neuron in the first intermediate layer, the arithmetic operation illustrated in the following equation (1) is performed. In one neuron, the output of each neuron of the previous layer coupled to the neuron is summed, and an arithmetic operation for adding a bias is performed. The bias in the following equation (1) is b1.

Equation 1

$$h_1 = f\left(\sum_i w^1_{i1} \cdot x_i + b_1\right) \quad (1)$$

Further, as illustrated in the above-described equation (1), an activation function f that is a non-linear function is used in the arithmetic operation with one neuron. As the activation function f, for example, an ReLU function illustrated in the following equation (2) is used. The ReLU function is a function that is 0 when the variable is 0 or less, and that is a value of the variable itself when the variable is greater than 0. However, it is known that various functions can be used as the activation function f, and a sigmoid function may be used, or a function obtained by improving the ReLU function may be used. In the above-described equation (1), the arithmetic equation for h1 is illustrated, but the same arithmetic operation may be performed for other neurons in the first intermediate layer.

Equation 2

$$f(x) = \max(0, x) = \begin{cases} 0 (x \leq 0) \\ x (x \geq 0) \end{cases} \quad (2)$$

The same applies to the subsequent layers. For example, when the weight between the first intermediate layer and the second intermediate layer is W2, in the neuron of the second intermediate layer, a product-sum operation using the output of the first intermediate layer and the weight W2 is performed, the bias is added, and an arithmetic operation for applying the activation function is performed.

In the neuron of the output layer, the output of the previous layer is weighted and added, and the arithmetic operation of adding the bias is performed. In the example of FIG. 3, the layer immediately one layer before the output layer is the second intermediate layer. The neural network uses the arithmetic operation result in the output layer as the output of the neural network. Otherwise, the result of performing some post-processing with respect to the arithmetic operation result of the output layer, may be output.

As can be seen from the description above, it is necessary to set appropriate weights and biases in order to obtain a desired output from the input. Hereinafter, the weight is also expressed as a weighting coefficient. The weighting coefficient may include the bias. In the learning, a data set in which a given input x is associated with a correct output t at the input is prepared. The correct output t is teacher data. The learning processing of the neural network can be considered as processing for obtaining the most probable weighting coefficient based on the data set. In the learning processing of the neural network, an error backpropagation method (backpropagation) is widely known.

Figure 4:
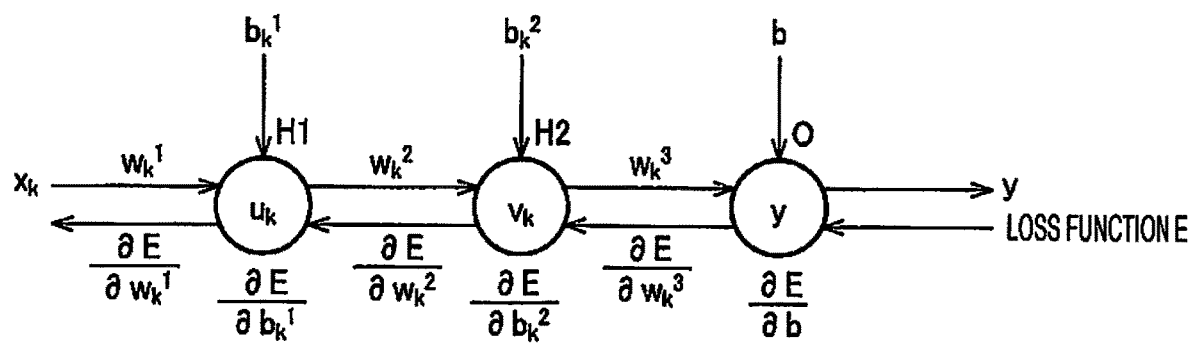
FIG. 4 illustrates a view for describing an error back-propagation method.

FIG. 4 illustrates a view for describing the error backpropagation method. In FIG. 4, for simplification of description, processing focusing on one neuron is illustrated for each of the first intermediate layer, the second intermediate layer, and the output layer. Further, the learning processing of the neural network is not limited to the one using the error backpropagation method.

In the error backpropagation method, the parameters are updated by repeating a forward pass and a backward pass. The parameter here is the above-described weighting coefficient. First, the output y is calculated by using the input x and the weighting coefficient at this time. In addition, the initial value of the weighting coefficient can be variously set. In the example of FIG. 4, the arithmetic operation of the following equations (3) to (5) are performed, and y is calculated from xk. In the following equations (3) to (5), u indicates the output of the first intermediate layer, and v indicates the output of the second intermediate layer.

Equation 3

$$y = \sum_{k=1}^{n} (w_k^3 \cdot v_k) + b \qquad (3)$$

Equation 4

$$v = f\left(\sum_{k=1}^{n} (w_k^2 \cdot u_k) b^2\right) \qquad (4)$$

Equation 5

$$u = f\left(\sum_{k=1}^{n} (w_k^1 \cdot x_k) b^1\right) \qquad (5)$$

In addition, a loss function E is obtained based on the obtained output y and teacher data t corresponding to the input x. The loss function E is, for example, the following equation (6), but may be a simple difference (y−t) or another loss function. The processing until the loss function E is obtained is called forward pass.

Equation 6

$$E = \tfrac{1}{2}(-t)^2 \qquad (6)$$

After the loss function E is obtained by the forward pass, each parameter is updated using a partial differential of the loss function E as illustrated in the following equations (7) to (12). In the following equations (7) to (12), the value with the subscript "+1" indicates the value after update processing. For example, $b_{+1}$ indicates the value of b after the update processing. In addition, indicates a learning rate. The learning rate is not constant and is preferably changed corresponding to a learning situation.

Equation 7

$$b_{+1} = b - \eta \frac{\partial E}{\partial b} \qquad (7)$$

Equation 8

$$w_{k+1}^3 = w_k^3 - \eta \frac{\partial E}{\partial w_k^3} \qquad (8)$$

Equation 9

$$b_{k+1}^2 = b_k^2 - \eta \frac{\partial E}{\partial b_k^2} \qquad (9)$$

Equation 10

$$w_{k+1}^2 = w_k^2 - \eta \frac{\partial E}{\partial w_k^2} \qquad (10)$$

Equation 11

$$b_{k+1}^1 = b_k^1 - \eta \frac{\partial E}{\partial b_k^1} \qquad (11)$$

Equation 12

$$w_{k+1}^1 = w_k^1 - \eta \frac{\partial E}{\partial w_k^1} \qquad (12)$$

At this time, the partial differential of the loss function E for each parameter is calculated from the output layer to the input layer using a chain rate. Specifically, each partial differential illustrated in the above-described equations (7) to (12) can be easily obtained by sequentially calculating the following equations (13) to (18). In addition, when the ReLU function of the above-described equation (2) is used as the activation function f, a differential value is 0 or 1, and thus, the arithmetic operation of the partial differential is easy. A series of processing using the equations (7) to (18) is called backward pass.

Equation 13

$$\frac{\partial E}{\partial b} = \frac{\partial E}{\partial y} \cdot \frac{\partial y}{\partial b} = (y - t) \qquad (13)$$

Equation 14

$$\frac{\partial E}{\partial w_k^3} = \frac{\partial E}{\partial y} \cdot \frac{\partial y}{\partial w_k^3} = (y - t) \cdot v_k \qquad (14)$$

Equation 15

$$\frac{\partial E}{\partial b_k^2} = \frac{\partial E}{\partial y} \cdot \frac{\partial y}{\partial v_k} \cdot \frac{\partial v_k}{\partial b_k^2} = (y - t) \cdot w_k^3 \cdot f'(v_k) \qquad (15)$$

Equation 16

$$\frac{\partial E}{\partial w_k^2} = \frac{\partial E}{\partial y} \cdot \frac{\partial y}{\partial v_k} \cdot \frac{\partial v_k}{\partial w_k^2} = (y - t) \cdot w_k^3 \cdot f'(v_k) \cdot u_k \qquad (16)$$

Equation 17

$$\frac{\partial E}{\partial b_k^1} = \frac{\partial E}{\partial y} \cdot \frac{\partial y}{\partial v_k} \cdot \frac{\partial v_k}{\partial u_k} \cdot \frac{\partial u_k}{\partial b_k^1} = (y - t) \cdot w_k^3 \cdot f'(v_k) \cdot w_k^2 \cdot f'(u_k) \qquad (17)$$

Equation 18

$$\frac{\partial E}{\partial w_k^1} = \frac{\partial E}{\partial y} \cdot \frac{\partial y}{\partial v_k} \cdot \frac{\partial v_k}{\partial u_k} \cdot \frac{\partial u_k}{\partial w_k^1} = (y - t) \cdot w_k^3 \cdot f'(v_k) \cdot w_k^2 \cdot f'(u_k) \cdot x_k \qquad (18)$$

In the learning processing according to the embodiment, x that is an input of the neural network is a pixel value of an image included in the training data. For example, the learning unit 120 resizes an image included in the training data in advance to vertical v pixels and horizontal h pixels, and uses v×h pixel values as inputs of the neural network. Specifically, one pixel value is input to one neuron in the input layer. However, the learning unit 120 is not prevented from performing some image processing, such as feature amount extraction processing, based on the image included in the training data and using the result of the image processing as an input of the neural network. As described above, other information, such as print setting information, may be input to the neural network. The teacher data t is the instruction history information included in the training data. For example, the instruction history information is information that becomes 1 when the print instruction is given and becomes 0 when the print instruction is not given. In addition, the instruction history information is not limited to binary data, and may be data of which the value changes corresponding to the number of times the print instruction is given. For example, the value of the instruction history information increases as the number of times the print instruction is given increases. The learned model which is the learning result receives the determination target image as an input, and outputs data of which the value increases as the probability of being a recommended image increases, as an output. The determination target image is input to the neural network after performing processing similar to the preprocessing in the learning processing, such as the processing for resizing the image to vertical v pixels and horizontal h pixels, and the feature amount extraction processing.

In FIG. 3, the neural network in a mode in which neurons in a given layer are coupled to all neurons in adjacent layers has been described. However, the configuration of the neural network is not limited thereto. For example, a convolutional neural network (CNN) may be used in the machine learning according to the embodiment. The CNN has a convolution layer and a pooling layer. The convolution layer performs a convolution operation. Here, the convolution operation is specifically filter processing. The pooling layer performs processing for reducing the vertical and horizontal sizes of data. For example, when the image data is input, the CNN can perform processing in consideration of the relationship between a given pixel and surrounding pixels thereof. In the CNN, the characteristics of the filter used for the convolution operation are learned by the machine learning. In other words, the weighting coefficient in the neural network includes the filter characteristics in the CNN.

As described above, the learning unit 120 generates the learned model by the machine learning. For example, the learned model is a neural network in which the weighting coefficients are set by learning. As illustrated in FIG. 3, the learned model has an input layer, an intermediate layer, and an output layer. In addition, in the learned model, the weighting coefficient between the input layer and the intermediate layer and the weighting coefficient between the intermediate layer and the output layer are set based on the data set in which the image is associated with the instruction history information. As described above, the number of intermediate layers may be two or more, and in this case, the weighting coefficient between a given intermediate layer and the next intermediate layer is also set by learning based on the data set. The learned model causes the computer to function so as to input the data of the determination target image received as an input to the input layer, perform the arithmetic operation based on the set weighting coefficients, and output the data that indicates whether or not the determination target image is the recommended image from the output layer.

Further, the method according to the embodiment may be applied to the learned model. The learned model is a learned model for determining whether or not the determination target image is a recommended image to be recommended for printing. In the learned model, the input layer, the intermediate layer, and the output layer are provided, and the weighting coefficients between the input layer and the intermediate layer and between the intermediate layer and the output layer are set based on the data set in which the image is associated with the instruction history information that indicates whether or not the user has instructed the printing of the image. The learned model causes the computer to function so as to input the data of the determination target image into the input layer, perform the arithmetic operation based on the set weighting coefficients, and output the data that indicates whether or not the determination target image is the recommended image from the output layer.

Above, an example in which the learned model is a model using the neural network has been described. However, the machine learning in the embodiment is not limited to the method using the neural network. For example, the method according to the embodiment can apply the machine learning of various widely known methods, such as a support vector machine (SVM), or a method developed from these methods.

3. Inference Processing 3.1 Configuration Example of Inference Device

Figure 5:
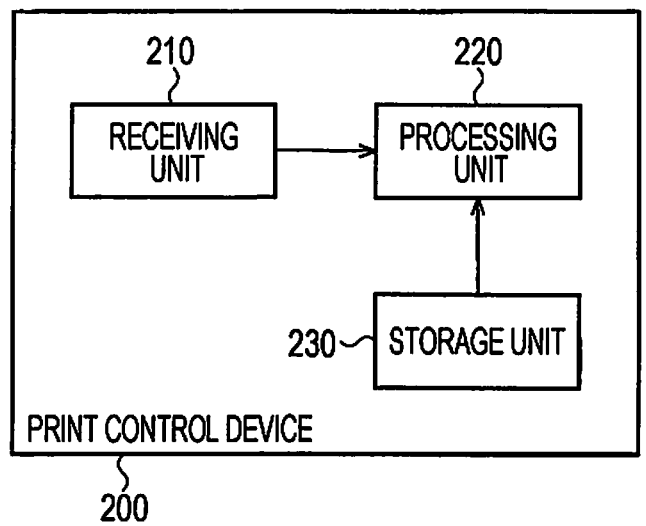
FIG. 5 illustrates a configuration example of a print control device.

FIG. 5 is a view illustrating a configuration example of the inference device according to the embodiment. The inference device is a print control device 200 that controls printing of the printing apparatus 10. The print control device 200 includes a receiving unit 210, a processing unit 220, and a storage unit 230.

The storage unit 230 stores the learned model that has performed the machine learning on the conditions of the recommended image to be recommended for printing based on the data set in which the image is associated with the instruction history information that indicates whether or not the user has instructed the printing of the image. The receiving unit 210 receives the input of the determination target image. The processing unit 220 performs processing for determining whether or not the determination target image is a recommended image based on the learned model. Specifically, the processing unit 220 outputs data that indicates whether or not the determination target image is a recommended image. The data that indicates whether or not the image is a recommended image is not limited to binary data, and is numerical data that indicates a probability, for example.

The learned model is used as a program module that is a part of artificial intelligence software. The processing unit 220 outputs the data that indicates whether or not the determination target image which is an input is a recommended image in accordance with the command from the learned model stored in the storage unit 230.

Similar to the learning unit 120 of the learning device 100, the processing unit 220 of the print control device 200 is configured by hardware including at least one of a circuit that processes a digital signal and a circuit that processes an analog signal. The processing unit 220 may be realized by the following processor. The print control device 200 according to the embodiment includes a memory that stores the information, and a processor that operates based on the information stored in the memory. As the processor, various processors, such as a CPU, a GPU, and a DSP, can be used. The memory may be a semiconductor memory, a register, a magnetic storage device, or an optical storage device.

In addition, the arithmetic operation in the processing unit 220 according to the learned model, that is, the arithmetic operation for outputting the output data based on the input data may be executed by software or may be executed by hardware. In other words, the product-sum operation, such as the above equation (1), or the filter operation in the CNN may be executed by the software. Otherwise, the above-described arithmetic operation may be executed by a circuit device, such as a field-programmable gate array (FPGA). Further, the above-described arithmetic operation may be executed by a combination of software and hardware. In this manner, the operation of the processing unit 220 according to the command from the learned model stored in the storage unit 230 can be realized by various modes.

Further, the print control device 200 may be one device or may include a plurality of devices. For example, the print control device 200 may be realized as a terminal device, such as a PC, and a server system operate in cooperation with each other. In addition, as will be described later with reference to FIG. 10, the learned model according to the embodiment may be updated using the result of the inference processing. By updating the learned model, the preference of the user can be appropriately reflected. However, the learned model may be created in advance and the learned model may be used fixedly.

Figure 6:
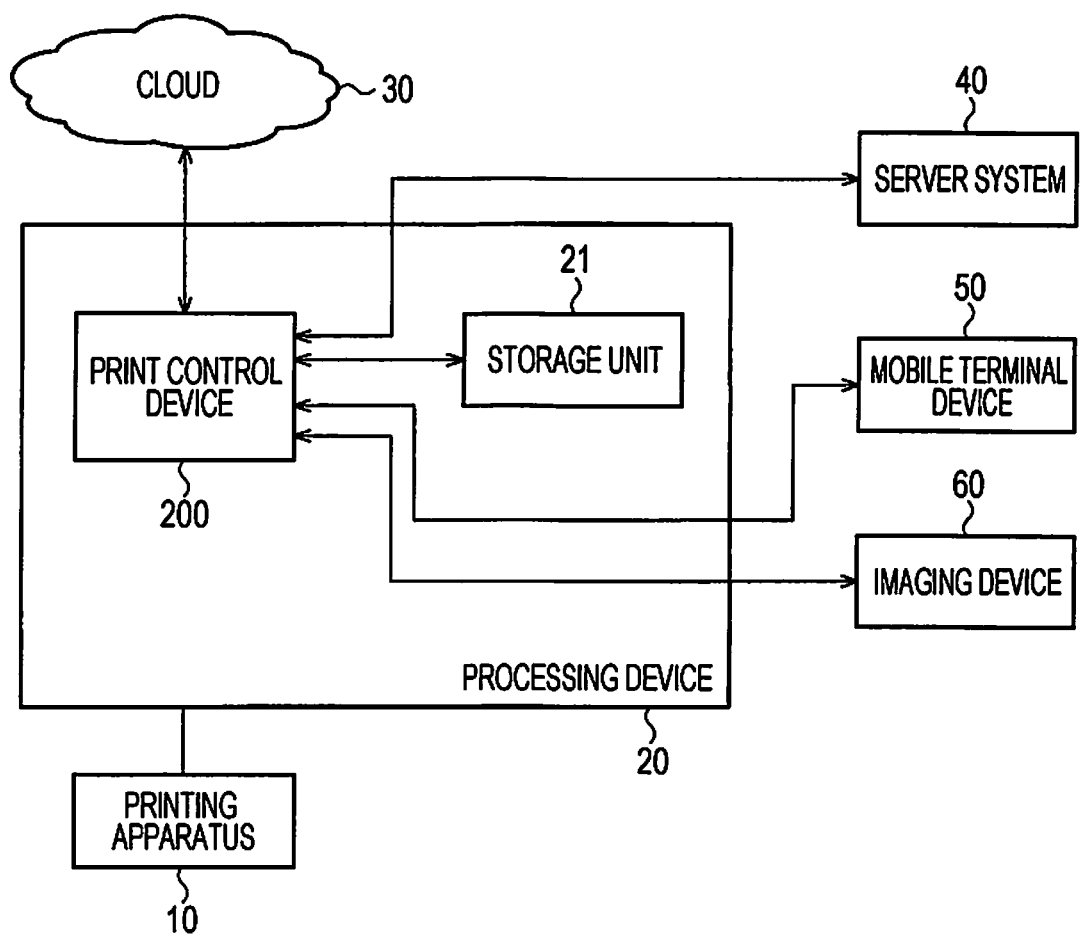
FIG. 6 illustrates a configuration example of a system including the print control device.

FIG. 6 is a configuration example of a system including the print control device 200. The print control device 200 is included in the processing device 20 connected to the printing apparatus 10, for example. The system configuration illustrated in FIG. 6 is the same as that illustrated in FIG. 2. The receiving unit 210 of the print control device 200 receives images stored in various storage media, such as the cloud 30, the server system 40, the mobile terminal device 50, and the imaging device 60, as a determination target image. When it is determined that the determination target image is a recommended image, the processing unit 220 performs notification with respect to the user for prompting the printing. For example, the print application of the processing device 20 performs display processing of recommended images and display processing of text or the like that prompts printing. In addition, when the user performs a printing operation of the recommended image, the print application determines that the recommended image is a print target image. Accordingly, the print application instructs the printing apparatus 10 to print the recommended image using the printer driver. In this manner, it becomes possible to smoothly execute the presentation processing and the printing processing of the recommended image. In addition, the print control device 200 may not be limited to the one included in the processing device 20, and may be included in another device. However, in consideration of smoothly controlling the printing apparatus 10, the print control device 200 is preferably included in a device directly connected to the printing apparatus 10.

3.2 Specific Example of Inference Processing

Figure 7:
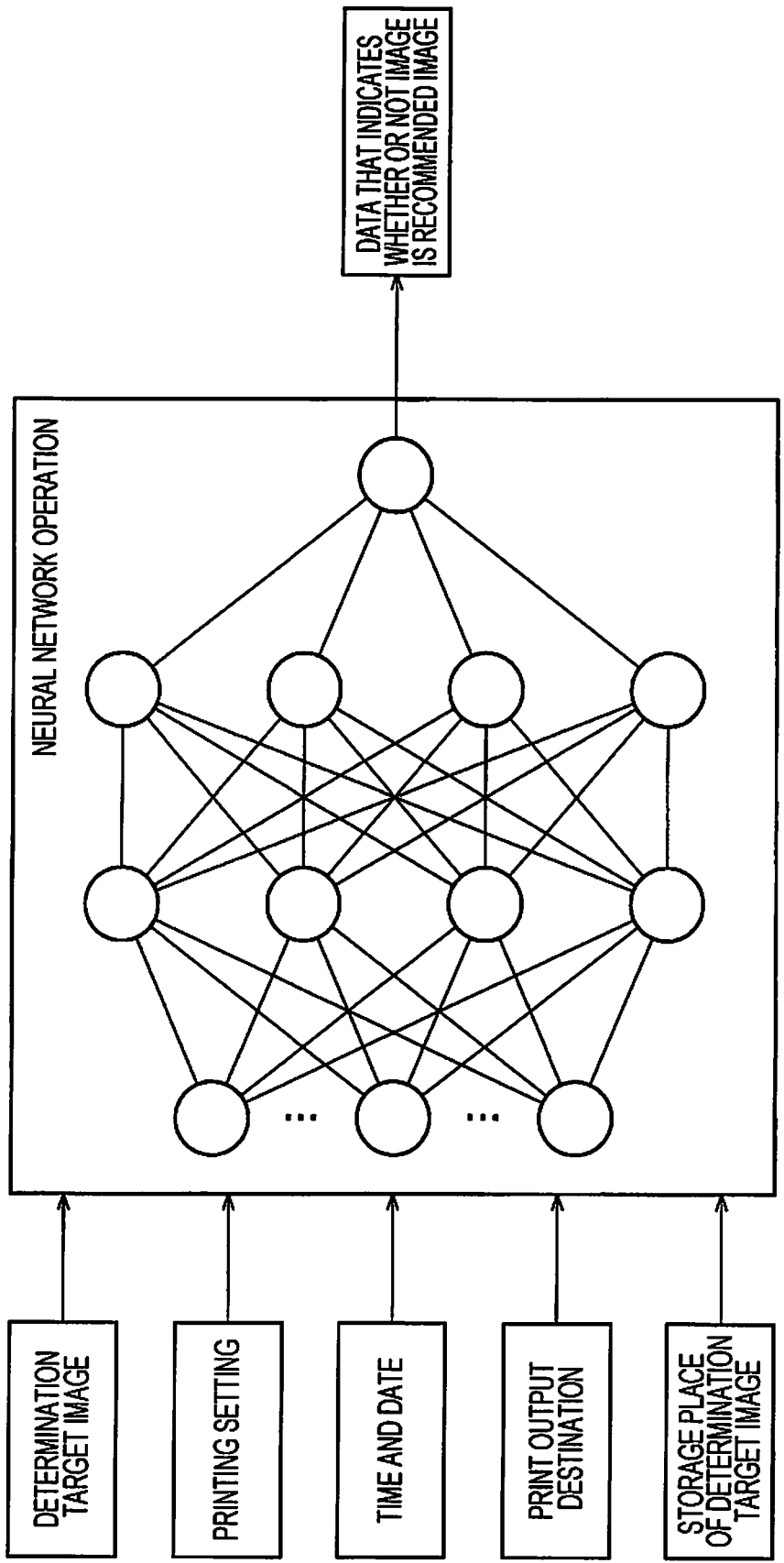
FIG. 7 illustrates a view for describing an example of input data and output data in inference processing.

FIG. 7 is a view illustrating a relationship between the input and the output in the inference processing according to the embodiment. In addition, in FIG. 7, the example that performs the neural network operation is described. The input in the inference processing includes at least the determination target image. In addition, the input in the inference processing may include the print setting information at the processing timing, the print time information that indicates date or time of the processing timing, the print output destination information that specifies the printing apparatus 10 set as the output destination, and the storage place information of the determination target image. The print setting information and the print output destination information are acquired from the printer driver. The print time information, such as date or time, is acquired from the time measuring unit, such as a real-time clock. Since the storage place information is an acquisition source of the determination target image, acquisition from the receiving unit 210 is possible.

However, as described above in the learning processing, the print setting information, the print time information, the print output destination information, and the storage place information are not essential, and some or all of the information can be omitted. The processing unit 220 acquires information used as training data in the learning processing among the print setting information and the like as an input in the inference processing. Further, as will be described later with reference to FIG. 11, some information may be used as teacher data in the learning processing and may be an output in the inference processing.

The processing unit 220 performs the neural network operation based on the inputs. Then, the processing unit 220 outputs information that indicates whether or not the determination target image is a recommended image, as an output. For example, the output is numerical data in a range from r to s, and is data of which the value increases as it is determined that the determination target image has a high probability of being a recommended image.

Figure 8:
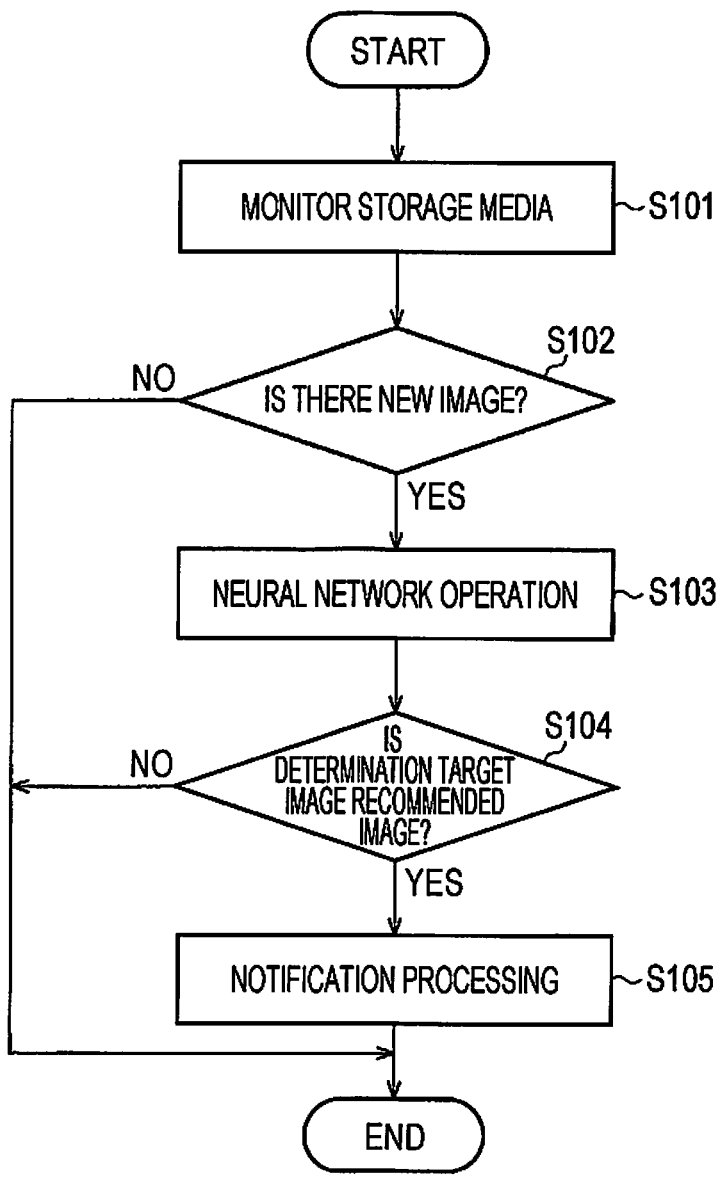
FIG. 8 illustrates a flowchart for describing the inference processing.

FIG. 8 is a flowchart for describing the inference processing in the processing unit 220. For example, the processing unit 220 executes the inference processing at a timing when a new image is added to a given storage medium. The processing unit 220 monitors storage media that are set in advance as monitoring targets (S101). In the example illustrated in FIG. 6, the processing unit 220 acquires information on images stored in the storage unit 21 of the processing device 20 itself, the cloud 30, the server system 40, the mobile terminal device 50, and the imaging device 60. The storage unit 21 may be the same storage medium as the storage unit 230 in which the learned model is stored, or may be a different storage medium. The image information acquired in the processing of S101 does not need to be image data, and is information having a relatively small amount of data, such as file names, metadata including exchangeable image file format (Exif), thumbnail images, and the like.

The processing unit 220 determines whether or not a new image has been added to the storage medium of the monitoring target based on the image information acquired in S101 (S102). For example, the processing unit 220 determines whether or not a new image has been added based on comparison processing between the information acquired in the latest processing of S101 and the information acquired in the processing of S101 executed in the past. When a new image has not been added (No in S102), the processing ends without performing the processing after S103.

When a new image has been added (Yes in S102), the processing unit 220 instructs the receiving unit 210 to acquire the determination target image. In addition, the receiving unit 210 or the processing unit 220 collects the print setting information and the like as necessary. Then, the processing unit 220 performs the neural network operation based on an input including at least the determination target image (S103).

Next, the processing unit 220 determines whether or not the determination target image is a recommended image based on the result of the neural network operation (S104). For example, when the output of the neural network is numerical data in a range of r to s, the processing unit 220 determines that the determination target image is a recommended image when the output value is equal to or greater than a given threshold Th (Th is a number that satisfies r<Th<s).

When it is determined that the determination target image is a recommended image (Yes in S104), the processing unit 220 performs a notification for recommending the printing of the determination target image. For example, the print control device 200 includes a display unit (not illustrated), and the processing unit 220 performs the processing for displaying the determination target image, the text that recommends the printing, and the like on the display unit. The display processing here is, for example, pop-up screen display processing. Otherwise, the print control device 200 may include a notification unit, such as a speaker or a light emitting unit, and the processing unit 220 may perform notification processing using the notification unit. When it is determined that the determination target image is not a recommended image (No in S104), the processing ends without performing the processing of S105. Further, the notification processing is not limited to the two processing for performing the notification or not. For example, the processing unit 220 may perform three types of notifications with different modes by classifying the output of the neural network into three types including a type of r to less than Th1, a type of Th1 to less than Th2, and a type of Th2 to less than s. Th1 and Th2 are numbers that satisfy r<Th1<Th2<s. For example, the processing unit 220 performs normal notification processing when the output value is equal to or greater than Th2, and performs notification with an alert when the output value is equal to or greater than Th1 and less than Th2. When the output is equal to or greater than Th1 and less than Th2, the reasoning reliability is lower than that when the output is equal to or greater than Th2, and thus, by attaching an alert, it becomes possible to prompt the user to respond carefully. In addition, various modification examples are possible for specific notification processing.

The processing unit 220 periodically executes the processing illustrated in FIG. 8. In this manner, when a new image is added to the storage medium which is a monitoring target, it becomes possible to appropriately determine whether or not to recommend printing the new image.

In addition, the timing at which the processing unit 220 performs the inference processing is not limited to the timing at which it is determined that a new image has been added. For example, the processing unit 220 may determine the occurrence of an event by cooperating with another application. In this case, the processing unit 220 uses the occurrence of an event as a trigger to perform the notification processing that prompts the printing of an image suitable for the event. The application here is a calendar application, a contact application, or the like. Various events, such as birthdays and Christmas, can be considered as events.

When an event is a trigger, it is difficult to limit the number of determination target images to one. For example, the processing unit 220 performs the neural network operation with respect to all images stored in an accessible storage medium, and determines whether or not each image is a recommended image. Otherwise, in consideration of a reduction in processing load and a reduction in processing time, it may be determined whether or not a recommended image is targeted for some of the accessible images.

4. Additional Learning Based on Inference Result

In the description above, the learning processing and the inference processing are individually described. For example, in the learning stage, the training data is accumulated in advance, and the learning processing is performed based on the accumulated training data. In the inference stage, the inference processing is performed by continuously using the generated learned model. In this case, the learned model once generated is fixed and is not expected to be updated.

However, the method according to the embodiment is not limited thereto, and the processing result in the inference stage may be fed back to the learning processing. Specifically, the learning unit 120 of the learning device 100 performs the machine learning on the conditions of the recommended image based on the data set in which the recommended image recommended based on the result of the machine learning is associated with the instruction history information that indicates whether or not the instruction for printing was performed on the recommended image. In this manner, since the learned model is updated based on the actual print instruction of the user, it becomes possible to select the recommended image according to the preference of the user.

For example, in the prior learning processing, the learned model may be generated using general-purpose training data, and the learning according to the preference of the user may be executed in parallel with the inference processing. Otherwise, the prior learning processing itself may be skipped. In this case, the initial value of the weighting coefficient is set without performing the learning processing. Otherwise, the learning processing may be performed using the training data intrinsic to the user in the prior learning processing. In this case, estimation processing that reflects the preference of the user to some extent is possible even when the additional learning is not performed, but it is possible to improve the accuracy by performing the additional learning, and to respond to changes in preference of the user.

Figure 9:
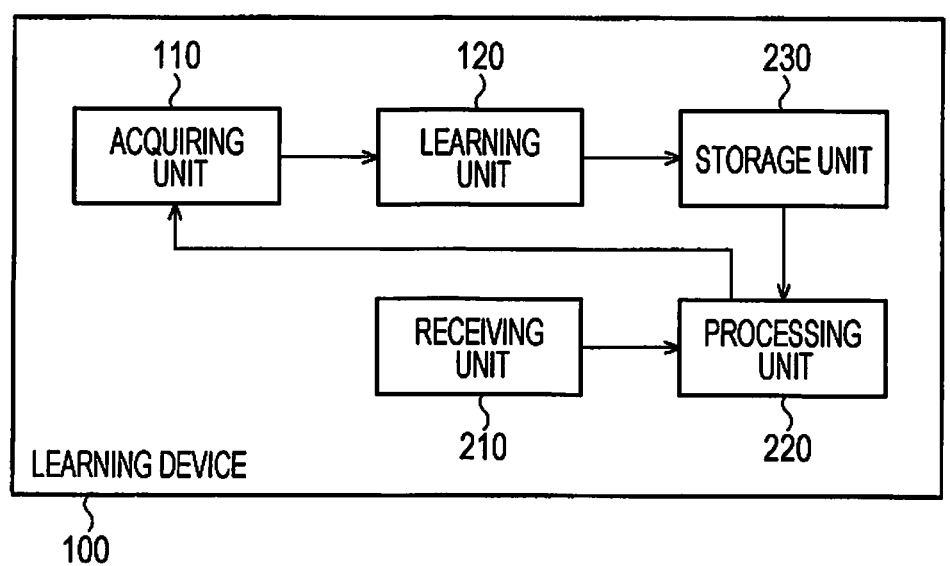
FIG. 9 illustrates another configuration example of the learning device.

FIG. 9 is a view illustrating a configuration example of the learning device 100 when the additional learning is performed. In addition to the acquiring unit 110 and the learning unit 120, the learning device 100 includes the storage unit 230 that stores the learned model generated by the learning unit 120 through the machine learning, and the processing unit 220 that determines whether or not the determination target image is a recommended image based on the learned model. The learning device 100 may include the receiving unit 210 that receives the determination target image. In other words, the learning device 100 in FIG. 9 is a learning device that includes the same configuration as that of the print control device 200 illustrated in FIG. 5 in addition to the configuration illustrated in FIG. 1 and can operate as the print control device 200.

Figure 10:
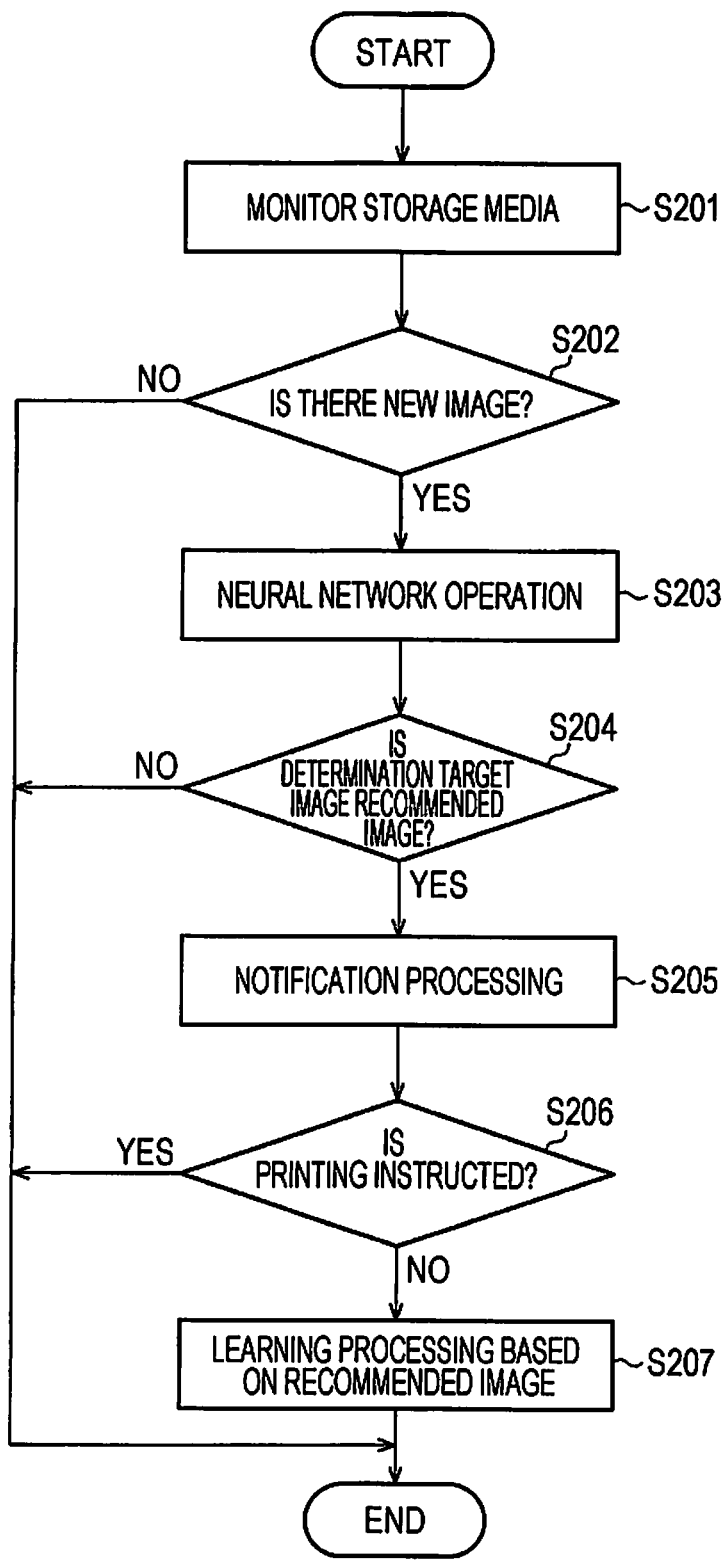
FIG. 10 illustrates a flowchart for describing processing for performing additional learning using an inference processing result.

FIG. 10 is a flowchart for describing the processing of the learning device 100 when performing the additional learning. In FIG. 10, an example in which the determination that a new image has been added to the storage medium is a trigger for the estimation processing is described, but as described above, other triggers, such as an event occurrence, may be used.

S201 to S205 in FIG. 10 are the same as S101 to S105 in FIG. 8. When the notification processing is executed by determining that the determination target image is a recommended image (S205), the processing unit 220 determines whether or not the recommended image is actually printed (S206). For example, the processing unit 220 may display a button or the like for instructing the print execution by starting the print application in the notification processing in S205. In this case, the determination in S206 is a determination as to whether or not an operation for the button was performed. Otherwise, the processing unit 220 may collect information on whether or not the print instruction for the recommended image was given by monitoring the printer driver in a given period after the notification in S205.

When the print instruction for the recommended image was not given (No in S206), the user does not desire to print the determination target image, and thus, it is determined that the inference result using the learned model is not appropriate. Accordingly, the learning unit 120 performs the learning processing based on the data set in which the image presented as a recommended image is associated with the instruction history information that indicates that the print instruction was not given (S207). Accordingly, the additional learning is performed in a direction of correcting inappropriate inferences, and thus, the learned model after the additional learning can perform an output according to the preference of the user.

In addition, although FIG. 10 illustrates an example in which the additional learning is performed when the inference result is incorrect, the disclosure is not limited thereto. For example, the learning unit 120 may perform the learning processing when the inference result is correct, that is, when the print instruction for the recommended image was given.

5. Modification Example

The example in which the print setting information is used as input data in the learning processing and the inference processing has been described above. In other words, in the learning processing, in the data set in which the image is associated with the instruction history information and the print setting information, the image and the print setting information are inputs and the instruction history information is the teacher data. In the inference processing, when the determination target image and the print setting information at processing timing are input, the data that indicates whether or not the determination target image is a recommended image is output by the learned model.

However, the usage mode of the print setting information is not limited thereto. For example, the print setting information may be used as output data in the learning processing and the inference processing. In the learning processing, in the data set in which the image is associated with the instruction history information and the print setting information, the image is an input, and the instruction history information and the print setting information are teacher data. For example, when the print setting information includes first setting information that indicates whether or not to use a photographic paper sheet and second setting information that indicates the printing speed, the output layer of the neural network includes at least three neurons. The first neuron is a neuron for outputting whether or not the input image is a recommended image, and the instruction history information is teacher data. The second neuron is a neuron for outputting whether or not to print the input image using the photographic paper sheet, and the first setting information of the print settings is teacher data. The third neuron is a neuron for outputting the printing speed at which the input image is printed, and the second setting information of the print setting information is teacher data.

FIG. 11 is a view illustrating a relationship between the input and the output in the inference processing according to the modification example. In FIG. 11, the printing time information, the print output destination information, and the storage place information are omitted. In the inference processing, the neural network receives the determination target image as an input, and outputs three output data by performing the neural network operation using the weighting coefficient learned by the above-described learning processing. The three outputs are data that indicates whether or not the determination target image is a recommended image, data that indicates whether or not the use of a photographic paper sheet is recommended for printing of the determination target image, and data that indicates the printing speed to be recommended for printing of the determination target image. In this manner, it becomes possible to suggest an appropriate print medium or printing speed based on the characteristics of the image.

Although the print setting information has been described above, the print output destination information can also be used as output data for the learning processing and the inference processing. For example, the learning device 100 performs the learning processing using the print output destination information as teacher data. The print control device 200 performs the inference processing for outputting the data that specifies the print output destination to be recommended for printing the determination target image, as an output. In this manner, it becomes possible to present an appropriate print output destination from a plurality of print output destination candidates, instead of using a set print output destination in a fixed manner. Therefore, it becomes possible to improve convenience of the user.

In addition, the print time information can also be used as output data for the learning processing and the inference processing. The learning device 100 performs the learning processing using the print time information as teacher data. The print control device 200 performs the inference processing for outputting the time to be recommended for printing the determination target image, as output data. In this manner, it becomes possible to prompt the recommended image to be printed at an appropriate timing according to the user, instead of prompting the user to perform printing immediately at the execution timing of the inference processing. For example, when the processing unit 220 of the print control device 200 determines that the determination target image is a recommended image, the processing unit 220 does not immediately perform the notification processing, but waits for a printing time specified by the output data to execute the notification processing.

In addition, the storage place information is assumed to be used as input data. However, when images with the same content are stored in the plurality of storage media, when considering a case of determining the images stored in which storage media should be printed by using the learned model, it is not prevented that the storage place information is used as output data.

As described above, in the method according to the embodiment, the condition that the image is input data and the instruction history information is output data only needs to be satisfied, and other information, such as print setting information, may be used as input data, may be used as output data, or may be excluded from the processing target. Further, other information which is not illustrated in FIG. 7 or FIG. 11 may be added, and various modification examples are possible regarding the data used for the learning processing and the inference processing.

As described above, the learning device according to the embodiment includes: the acquiring unit that acquires the image and the instruction history information that indicates whether or not the instruction for printing was given to the image; and the learning unit that performs the machine learning on conditions of the recommended image to be recommended for printing based on the data set in which the image is associated with the instruction history information.

According to the method of the embodiment, as the machine learning using the image and the instruction history information of the printing with respect to the image is performed, it becomes possible to appropriately learn the condition for selecting the recommended image. By performing the processing based on the learning result, it is possible to automatically select the image to be recommended for printing, and thus, the burden on the user can be reduced.

In addition, the learning unit according to the embodiment may perform the machine learning on the conditions of the recommended image based on the data set in which the recommended image recommended based on the result of the machine learning is associated with the instruction history information that indicates whether or not the instruction for printing was given to the recommended image.

In this manner, the additional learning can be performed depending on whether or not the recommended image recommended based on the learning result is actually the target of the print instruction. Accordingly, it becomes possible to update the learning result to be a more appropriate.

Further, the learning unit according to the embodiment may perform the machine learning on the conditions of the recommended image based on the data set in which the image is associated with the instruction history information and the print setting information that indicates the print setting of the image.

In this manner, it becomes possible to learn about the print setting in addition to the image and the instruction history information.

Further, the learning unit according to the embodiment may perform the machine learning on the conditions of the recommended image based on the data set in which the image is associated with the instruction history information and the print time information that indicates the print time of the image.

In this manner, it becomes possible to learn about the print time in addition to the image and the instruction history information.

Further, the learning unit according to the embodiment may perform the machine learning on the conditions of the recommended image based on the data set in which the image is associated with the instruction history information and the print output destination information that indicates the print output destination.

In this manner, it becomes possible to learn about the print output destination in addition to the image and the instruction history information.

Further, the learning unit according to the embodiment may perform the machine learning on the conditions of the recommended image based on the data set in which the image is associated with the instruction history information and the storage place information that indicates the storage place of the image.

In this manner, it becomes possible to learn about the storage place in addition to the image and the instruction history information.

In addition, the learning device according to the embodiment includes the storage unit that stores the learned model generated by the learning unit through the machine learning, and the processing unit that determines whether or not the determination target image is a recommended image based on the learned model.

In this manner, in the learning device, it becomes possible to execute the processing for determining the recommended image based on the learning result.

Further, the learning unit according to the embodiment may generate the learned model by the machine learning. In the learned model, the input layer, the intermediate layer, and the output layer are provided, and the weighting coefficients between the input layer and the intermediate layer and between the intermediate layer and the output layer are set based on the data set in which the image is associated with the instruction history information. The learned model causes the computer to function so as to input the data of the determination target image received as an input to the input layer, perform the arithmetic operation based on the set weighting coefficients, and output the data that indicates whether or not the determination target image is the recommended image from the output layer.

In this manner, it becomes possible to generate the learned model that can appropriately determine whether or not the image is the recommended image by learning the weighting coefficient through the learning processing. More specifically, it becomes possible to generate the learned model using the neural network.

In addition, the print control device according to the embodiment is a print control device that controls the printing of the printing apparatus, and includes the storage unit, the receiving unit, and the processing unit. The storage unit stores the learned model that has performed the machine learning on the conditions of the recommended image to be recommended for printing based on the data set in which the image and the instruction history information that indicates whether or not the instruction for printing was given to the image. The receiving unit receives the input of the determination target image. The processing unit determines whether or not the determination target image is a recommended image based on the learned model.

In this manner, it becomes possible to appropriately determine whether or not to recommend the printing of a given determination target image based on the learned model which is the result of the machine learning. In addition, as the print control device performs the determination as described above, it is possible to smoothly execute the printing processing when the print instruction of the recommended image was given.

The learned model according to the embodiment is a learned model for determining whether or not the determination target image is a recommended image to be recommended for printing. In the learned model, the input layer, the intermediate layer, and the output layer are provided, and the weighting coefficients between the input layer and the intermediate layer and between the intermediate layer and the output layer are set based on the data set in which the image and the instruction history information that indicates whether or not the instruction for printing was given to the image. In addition, the learned model causes the computer to function so as to input the data of the determination target image into the input layer, perform the arithmetic operation based on the set weighting coefficients, and output the data that indicates whether or not the determination target image is the recommended image from the output layer.

Although the embodiment has been described in detail as described above, a person skilled in the art can easily understand that many modifications that do not substantially depart from the novel matters and effects of the embodiment are possible. Therefore, all such modifications are intended to be included within the scope of the disclosure. For example, a term described at least once together with a different term having a broader meaning or the same meaning in the specification or the drawings can be replaced with the different term anywhere in the specification or the drawings. In addition, all combinations of the embodiment and the modification examples are also included in the scope of the disclosure. Further, the configuration and operation of the learning device, the print control device, and the system including the devices are not limited to those described in the embodiment, and various modifications can be made.

What is claimed is:

1. A learning device comprising:
a processor configured to execute a plurality of units including
an acquiring unit that acquires an image and a first instruction history information that indicates whether or not an instruction for printing was given to the image; and
a learning unit that performs machine learning on conditions of an image to be recommended for printing, based on a first data set in which the image as inputs is associated with the first instruction history information as a correct answer label,
wherein a notification of a recommended image recommended based on a result of the machine learning is performed,
the acquiring unit acquires a second instruction history information that indicates whether or not an instruction for printing was given to the recommended image as a result of the notification, and
the learning unit performs additional machine learning on the conditions of the image to be recommended for printing, based on a second data set in which the recommended image is associated with the second instruction history information that indicates whether or not the instruction for printing was given to the recommended image.

2. The learning device according to claim 1, wherein the learning unit performs machine learning on the conditions of the image to be recommended for printing, based on the first data set in which the image and print setting information that indicates at least one of a print medium used for printing the image and a printing speed of the image as the inputs are associated with the first instruction history information as the correct answer label, or based on the first data set in which the image as the inputs is associated with the first instruction history information and the print setting information as the correct answer label.

3. The learning device according to claim 1, wherein the learning unit performs machine learning on the conditions of the image to be recommended for printing, based on the first data set in which the image is associated with the first instruction history information and print time information that indicates a print time of the image.

4. The learning device according to claim 1, wherein the learning unit performs machine learning on the conditions of the image to be recommended for printing, based on the first data set in which the image is associated with the first instruction history information and print output destination information that indicates a print output destination.

5. The learning device according to claim 1, wherein the learning unit performs machine learning on the conditions of the image to be recommended for printing, based on the first data set in which the image is associated with the first instruction history information and storage place information that indicates a storage place of the image.

6. The learning device according to claim 1, further comprising:
a memory that stores a learned model generated by the machine learning of the learning unit, wherein
the processor is configured to execute the plurality of units further including
a processing unit that determines, based on the learned model, whether or not a determination target image is the image to be recommended for printing.

7. The learning device according to claim 1, wherein the learning unit generates a learned model by the machine learning,
the learned model has an input layer, an intermediate layer, and an output layer,
weighting coefficients between the input layer and the intermediate layer and between the intermediate layer and the output layer are set in the learned model based on the first data set and the second data set, and
the learned model causes a computer to input, to the input layer, data about a determination target image received as an input, perform an arithmetic operation based on the weighting coefficients being set, and output, from the output layer, data that indicates whether or not the determination target image is the image to be recommended for printing.

8. A print control device for controlling printing of a printing apparatus, the print control device comprising:
a memory that stores a learned model obtained by performing machine learning on conditions of an image to be recommended for printing, based on a first data set in which an image as inputs is associated with a first instruction history information, which indicates whether or not an instruction for printing was given to the image, as a correct answer label, and by performing additional machine learning on the conditions of the image to be recommended for printing, based on a second data set in which a recommended image that is recommended based on a result of the machine learning and that a notification is performed for is associated with a second instruction history information that indicates whether or not the instruction for printing was given to the recommended image as a result of the notification; and
a processor configured to execute a plurality of units including
a receiving unit that receives an input of a determination target image, and
a processing unit that determines, based on the learned model, whether or not the determination target image is the image to be recommended for printing.

9. A non-transitory computer-readable medium for storing, as a program, a learned model for determining whether or not a determination target image is a image to be recommended for printing, the learned model comprising:
an input layer, an intermediate layer, and an output layer, wherein
weighting coefficients between the input layer and the intermediate layer and between the intermediate layer and the output layer are set based on a first data set based on which a machine learning is performed and a second data set based on which an additional machine learning is performed, the first data set is a data set in which an image as inputs is associated with a first instruction history information as a correct answer label, the first instruction history information indicates whether or not an instruction for printing was given to the image, the second data set is a data set in which a recommended image that is recommended based on a result of the machine learning and that a notification is performed for is associated with a second instruction history information, the second instruction history information indicates whether or not an instruction for printing was given to the recommended image as a result of the notification, and the learned model causes a computer to input, to the input layer, data about the determination target image received as an input, perform an arithmetic operation based on the weighting coefficients being set, and output, from the output layer, data that indicates whether or not the determination target image is the image to be recommended for printing.

* * * * *